(12) United States Patent
Schumacher et al.

(10) Patent No.: US 6,691,499 B2
(45) Date of Patent: Feb. 17, 2004

(54) CROP LIFTER

(75) Inventors: Gustav Schumacher, Gartenstrasse 8, D-57612, Eichelhardt (DE); Friedrich-Wilhelm Schumacher, Eichelhardt (DE)

(73) Assignee: Gustav Schumacher (DE)

( * ) Notice: Subject to any disclaimer, the term of this patent is extended or adjusted under 35 U.S.C. 154(b) by 0 days.

(21) Appl. No.: 10/167,171

(22) Filed: Jun. 10, 2002

(65) Prior Publication Data

US 2003/0005678 A1 Jan. 9, 2003

(30) Foreign Application Priority Data

Jun. 11, 2001 (DE) .......................... 101 28 101

(51) Int. Cl.$^7$ ............................................. A01D 34/40
(52) U.S. Cl. ...................................................... 56/312
(58) Field of Search ..................... 56/119, 94, 121.42, 56/126, 219, 312, 313

(56) References Cited

U.S. PATENT DOCUMENTS

| | | | | |
|---|---|---|---|---|
| 737,028 A | * | 8/1903 | Seidl | 56/313 |
| 843,164 A | * | 2/1907 | McCutchan | 56/313 |
| 1,818,335 A | * | 8/1931 | Kenison | 56/312 |
| 2,141,299 A | * | 12/1938 | Hume et al. | 56/313 |
| 2,141,300 A | * | 12/1938 | Hume et al. | 56/313 |
| 2,484,704 A | * | 10/1949 | Girodat | 56/312 |
| 2,576,122 A | * | 11/1951 | Kenison | 56/312 |
| 2,577,324 A | * | 12/1951 | Goesch | 56/312 |
| 2,960,814 A | * | 11/1960 | Babcock | 56/312 |
| 3,313,095 A | * | 4/1967 | Gaterman | 56/312 |
| 3,821,877 A | * | 7/1974 | Weinheimer | 56/312 |
| 3,913,306 A | * | 10/1975 | Schumacher et al. | 56/313 |
| 6,244,026 B1 | * | 6/2001 | Minnihan et al. | 56/119 |
| 6,442,919 B1 | * | 9/2002 | Schumacher et al. | 56/307 |

FOREIGN PATENT DOCUMENTS

| | | |
|---|---|---|
| DE | 191 691 C | 7/1906 |
| DE | 199 02 456 A1 | 9/1999 |

* cited by examiner

*Primary Examiner*—Robert E. Pezzuto
*Assistant Examiner*—Nathan Mammen
(74) *Attorney, Agent, or Firm*—Harness, Dickey & Pierce, P.L.C.

(57) ABSTRACT

A crop lifter for harvesting machine reaping systems with reaping fingers (2). The crop lifter (2) has a support bar (6). An attachment element (10) is mounted on, and connected to the support bar (6). The attachment element (10) retains the crop lifter on the reaping finger (2) in different alignment positions. The attachment element (10) comprises a holding element (11) with two distanced legs (12). The tip of the reaping finger (2) can be inserted between the legs (12). A retaining lever (16) is supported between the two legs (12) on a pivot pin (15). The retaining lever (16) has a first lever arm (17) with an adjusting screw (20). The adjustment screw (20) can be brought into contact with the upper side of the reaping finger (2). A second lever arm (18) of the retaining lever (16) has two retaining faces (24, 24a). A retaining element, in the form of a leaf spring (25) has a front face (26). The front face (26), depending on the pivoting position of the retaining lever (16) contacts one of the retaining faces (24, 24a). This retains the retaining lever (16), so that the support bar (6) can be brought in reference to the reaping finger (2) into different rough approximate positions. The positions can then be finely adjusted by turning the adjustment screw (20).

11 Claims, 3 Drawing Sheets

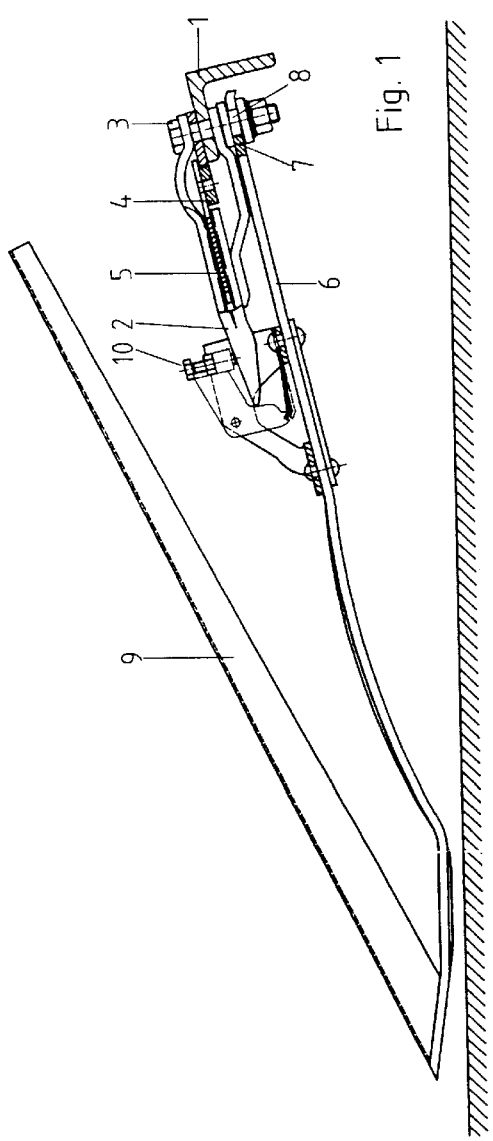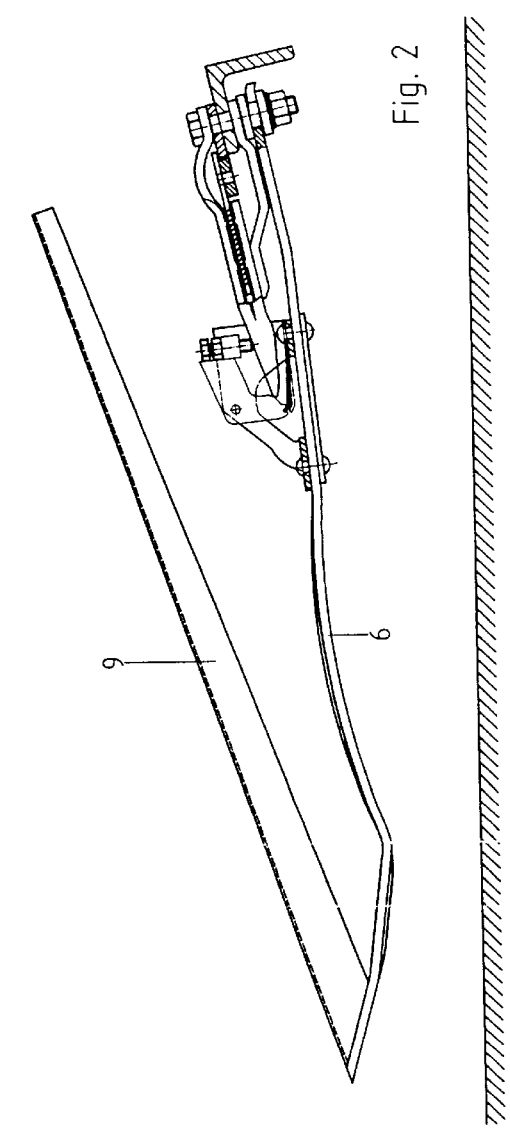

CROP LIFTER

CROSS-REFERENCE TO RELATED APPLICATION

This application claims priority to German Patent Application No. 10128101.3 filed Jun. 11, 2001, which application is herein expressly incorporated by reference.

BACKGROUND OF THE INVENTION

The invention relates to crop lifters for harvesting machines reaping systems with reaping fingers mounted on a bed plate.

In reaping systems, the reaping fingers are, for example, screwed on along the bed plate. The bed plate guides the cutter bar and serves as the counter cutting blade for the cutting edges of the reaping blades attached to a reciprocating cutter bar. Crop lifters are used to cut bent or lying cereals. The crop lifters lift the cereals. Different positions of the reaping system are necessary depending upon the type or the nature of the cereals and on the required cutting height. Accordingly, the alignment of the crop lifter towards the ground changes. However, an alignment is required which provide the best parallel guiding of the sliding area of the crop lifter to the ground. In practice, this is achieved by crop lifters that enable a change of the orientation of their portion which projects beyond the tip of the reaping fingers. Thus, this portion is lifted or lowered more or less in relation to the reaping fingers.

DE 199 02 459 A1 discloses an attachment element arranged to the support bar of the crop lifter, which includes a holding element with two parallel legs. The tip of a reaping finger is insertable between the legs. Further, a retaining lever is pivotably supported around a pivot pin between the two legs. The retaining lever has a first lever arm with a support face. The support face supports the upper side of the reaping finger. A second lever arm has at least one retaining face. A retaining element, in the form of a leaf spring, contacts a retaining face of the retaining lever and secures the retaining lever against displacement.

An advantage of this embodiment is that the alignment of the crop lifter starting from the disengaged position and the tip of the reaping finger contacts one of the lever arms starting the pivoting of the retaining lever to the retaining position. In order to displace the retaining lever into the wanted position, a portion of the crop lifter projecting from the tip of the reaping finger is lifted with one hand and the second arm of the retaining lever is pushed with the other hand, so that the second arm of the retaining lever, the second arm can be brought into contact with the retaining element. Thus, fine alignment adjustment, which is desired is only theoretically achievable.

Theoretically, it is possible to provide a large number of retaining faces, however, in practice only three retaining faces are realised due to the necessary strength and handling. In order to achieve a finer adjustment with index notches, the angle lever would need to be enlarged. Such an angle lever, however, would not be able to be incorporated into the reaping system, as it would negatively influence the function of the reaping system.

SUMMARY OF THE INVENTION

The present invention provides a crop lifter, which enables, only a few retaining faces yet still provides a fine adjustment of its position.

The present invention provides a crop lifter for a harvesting machine reaping systems with reaping fingers attached on a bed plate, comprising a support bar connectable to the bed plate. A grain lifter is connected to the support bar. An attachment element is connected to the support bar and retainable on the reaping finger. A holding element is attached on the support bar. A retaining lever is pivotably supported around a pivot pin on the holding element. The retaining lever includes a first lever arm with an adjusting screw supported on the reaping finger. Also, the retaining lever has a second lever arm with at least one retaining face. A retaining element contacts a retaining face of the retaining lever and retains the same against displacement.

Preferably, the retaining faces are formed as part of retaining teeth. Advantageously the retaining element is formed by a leaf spring elastically urged in the direction towards the retaining faces of the retaining lever to contact the retaining faces. The respectively rough pre-adjustment is carried out automatically, without having to carry out a locking by hand. To provide retainment, the leaf spring is provided with a front face, which abuts one of the retaining faces. This, for example, can be the free end of the otherwise stationary kept leaf spring. Accordingly, an orientation can be achieved, which ensures that the leaf spring escapes when a pressure is exerted on it. However, an embodiment is also possible, where the leaf spring has a through hole. One of the faces of the through hole is formed as a contact face. The retaining lever, via its retaining face, contacts the contact face. Thus, an arrangement which ensures that the leaf spring is tensioned in the retained condition may be achieved.

An advantageous embodiment is achieved, when the first and the second lever arm abut each other at an angle. Also, the pivoting axis of the pivot pin is arranged in the abutment area of the same. Accordingly, the retaining lever preferably includes a bore. The retaining lever is carried by the pivot pin via the bore. Disengagement is achieved by the retaining lever being disconnected from the retaining element. A screw driver can be used in the embodiment where the retaining element is a leaf spring. Accordingly, a U-like form is achieved for the holding element. In a further embodiment, the retaining element is arranged between the two legs in the movement area of the second lever arm.

From the following detailed description, taken in conjunction with the accompanying drawings and subjoined claims, other objects and advantages of the present invention will become apparent to those skilled in the art.

BRIEF DESCRIPTION OF THE DRAWINGS

FIG. 1 is a side elevation view of a crop lifter in relation to a bed plate, in a first alignment position;

FIG. 2 is a side elevation view like FIG. 1, however in a changed alignment position;

DETAILED DESCRIPTION OF THE PREFERRED EMBODIMENTS

Figure 3:
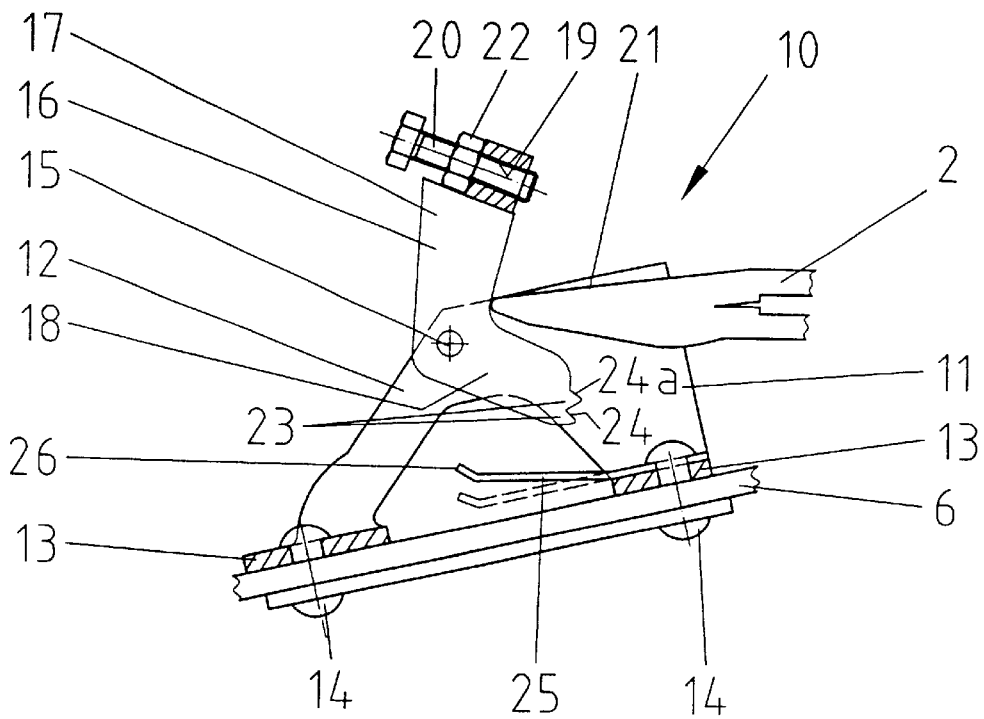
FIG. 3 is a longitudinal sectional view of a first embodiment of an attachment element in the released position.

FIG. 1 is a cross-section through a bed plate 1. A reaping finger 2 is arranged on the bed plate 1. The reaping finger 2 is mounted by a screw 3 on the bed plate 1. The cutter bar 4, which carries the blades, can reciprocate in a gap of the reaping finger 2. The cutter bar 4 moves into or out of the plane of the sheet of drawing paper. The reaping finger 2 includes an upper finger and a lower finger. The blade is held between the upper and lower fingers. The reaping finger 2 acts as a counter cutting edge for the cutting edges of the blades 5.

The crop lifter includes a support bar 6. The support bar 6 includes a recess at its attachment end 7. The recess can be inserted into a groove 8 of an annular element, which sits on the screw 3. The support bar 6 is elastic. A grain lifter 9, extending at an angle, is projectingly connected to the free end projecting beyond the reaping finger 2. An attachment element 10 is arranged in the portion between the attachment end 7 of the support bar and the end, on which the grain lifter 9 is attached. The attachment element 10 serves to align the crop lifter with its portion projecting beyond the reaping finger 2 relative to the ground. Thus, the support bar 6 is tensioned and the attachment element 10 serves to position in reference to the reaping finger 2 in different positions.

The first embodiment is described by FIGS. 1 to 5 and 8. The attachment element 10 according to the first embodiment includes a holding element 11, with a U-like cross-section and two legs 12. Only one leg is visible. The legs 12 are arranged parallel at a distance and are connected to each other by means of two webs 13. The webs 13 abut the support bar 6 and are connected to the support bar to retain the holding element 11 by rivets 14 or screws with the interpositioning of a backing plate onto the side of the support bar 6 facing away from the webs 13. A pivot pin 15 is provided, distanced from the webs 13 on portions of the two legs 12. The pivot pin is connected to the two legs 12. The pivot pin 15 supports a retaining lever 16 between the two legs 12.

The lever 16 includes a bore. The retaining lever 16 has an angle lever with a first lever arm 17 and a second lever arm 18. The pivot pin 15 supports the retaining lever 16 roughly in the portion, at which the two lever arms 17, 18 abut each other. On the free end of the first lever arm 17 a thickening is provided with a threaded bore 19 extending through the thickening portion. An adjusting screw 20 is inserted into this threaded bore 19. Its end projects from the threaded bore 19 and its screw end is supported on the upper side of the tip of the reaping finger 2 projecting between the legs 12 of the holding element 11. A lock nut 22 is arranged between the hexagon head of the adjusting screw 20 facing away from the reaping finger 2 and the first lever arm 17. The nut 22 can be tightened against the first lever arm 17.

The adjusting screw can be adjusted starting from a position where the screw end does not yet contact the upper side 21 of the reaping finger 2, to a position, where it projects extensively from the threaded bore 19. This adjustment can be carried out in the different pivot positions. The retaining lever 16 can be retained to achieve the required alignment position of the portion of the crop lifter towards the reaping finger 2, which portion contacts the ground. The operator can act on the outer face of the first lever arm 17 by hand for the pivoting movement. The second lever arm 18 has on its free end distanced from the pivot pin 15 two teeth 23. The teeth form a retaining face 24 or 24a. A sliding face is provided in front of the tooth 23 having the first retaining face 24. The end of the second lever arm 18, having the teeth 23 and the retaining faces 24, 24a, lies in the movement path of the front face 26 of an end of the leaf spring 25. The leaf spring end is bent at an angle and serves as a retaining element. The leaf spring end distanced from the front face 25 is connected rigidly by means of the rivets 14 or the screws to the holding element 11 and the support bar 6. The screw end of the adjusting screw 20 projects only a bit from the threaded bore 19 to the upper side 21 of the tip of the reaping finger 2. The retaining lever 16 is represented in FIG. 3 disengaged from the leaf spring 25.

Figure 4:
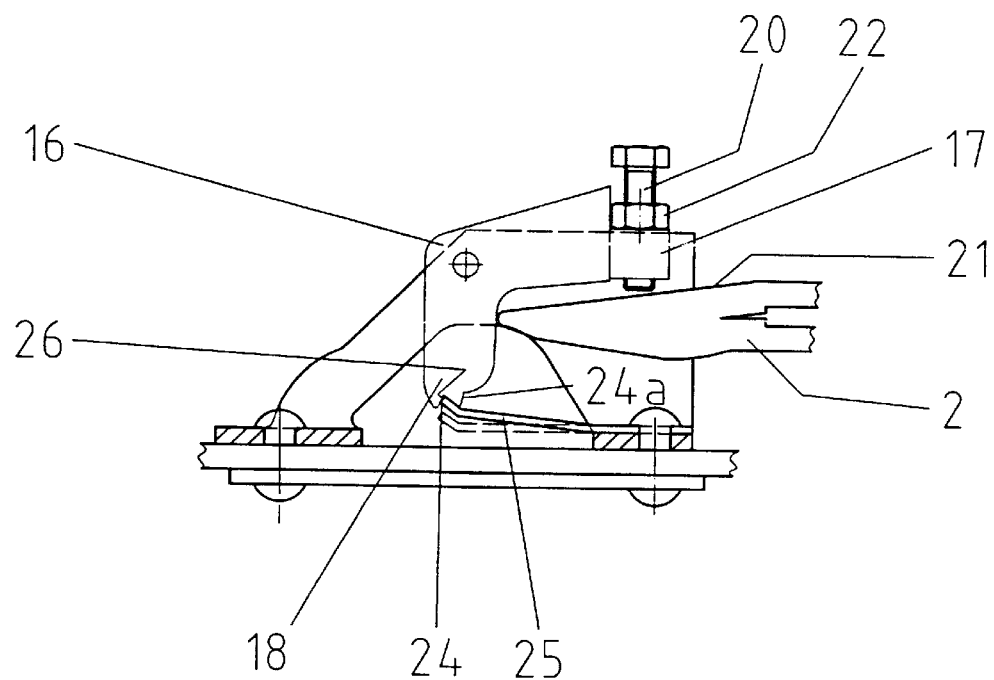
FIG. 4 is a sectional view according to FIG. 3 with the retaining lever retained in the first of two retaining positions.
Figure 5:
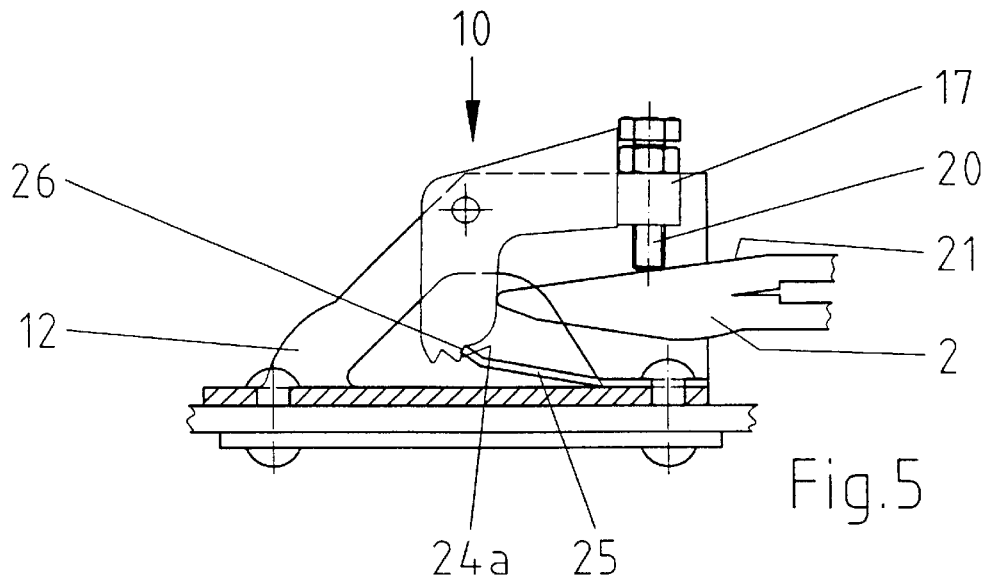
FIG. 5 is a sectional view according to FIG. 4 with the retaining lever retained in a second retaining position with fine adjustment accomplished by an adjusting screw.

When further moving the attachment element 10 upwards to the reaping finger 2, the spring gets into the area of the second lever arm 18 of the retaining lever 16. The retaining arm 16 pivots clockwise around the pivot pin 15. Only by acting on the outer face of the first lever arm 17 of the retaining lever 16, by hand, can the retaining lever be pivoted in such that the retaining face 24 of the first tooth 23 abuts the front face 26 of the leaf spring 25. The spring 25 is, firstly, displaced downwards by the sliding face, so that the position represented in FIG. 4 is taken up. The retaining lever 16 is supported in a left turning sense with its retaining face 24 on the front face 26 of the leaf spring 25. As the spring is stationarily retained, the retaining lever 16 is retained.

The adjusting screw 20 is not yet supported by its screw end on the upper side 20 of the reaping finger 2. The adjusting screw 16 can be screwed out so far, that its screw end acts onto the upper side 21 of the reaping finger 2. The adjustment can be carried out so far, that the screw end projects maximally from the threaded bore 19. This position is visible in FIG. 2 for engagement with the second tooth. The support bar 6 is arranged in a first distance position area to the reaping finger 2. When the retaining lever 16 is rotated in the right pivoting sense, by pressing onto the outer face of the first lever arm 17, and at the same time lifting the free end of the support bar 6, the retaining lever 16 can be pivoted into the position represented in FIG. 5. Here the front face 26 of the leaf spring 25 abuts the second retaining face 24a. It is visible, that in this position the distance between the web 13 and the reaping finger 2 is clearly smaller, than in the position, which is represented in FIG. 3. Additionally, the adjusting screw 20 is adjusted after retainment with the second retaining face 24a. Thus, its screw end projects completely from the threaded bore 19. Hereby, the free end of the crop lifter is displaced into a position more or less directed upwards. A screwdriver can be inserted into the area between the two legs 12 to act upon the leaf spring 15 to disengage the attachment element 10. Additionally to facilitate disengagement, the retaining lever 16 can be pivoted clockwise until the leaf spring 25 is released and takes up a position which is represented with dashed lines in FIGS. 3 and 4. The retaining lever 16 can then pivot back into the position represented in FIG. 3.

Figure 8:
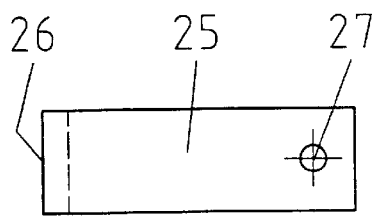
FIG. 8 is an elevation view of a leaf spring as a retaining element and fitting to the embodiment according to FIGS. 1 to 5.

In the leaf spring 25 represented in FIG. 8 the bore 27 is visible. The rivet 14 (see FIGS. 3 to 5) is passed through the bore to attach the leaf spring 25 together with the holding element on the support bar 6.

Figure 6:
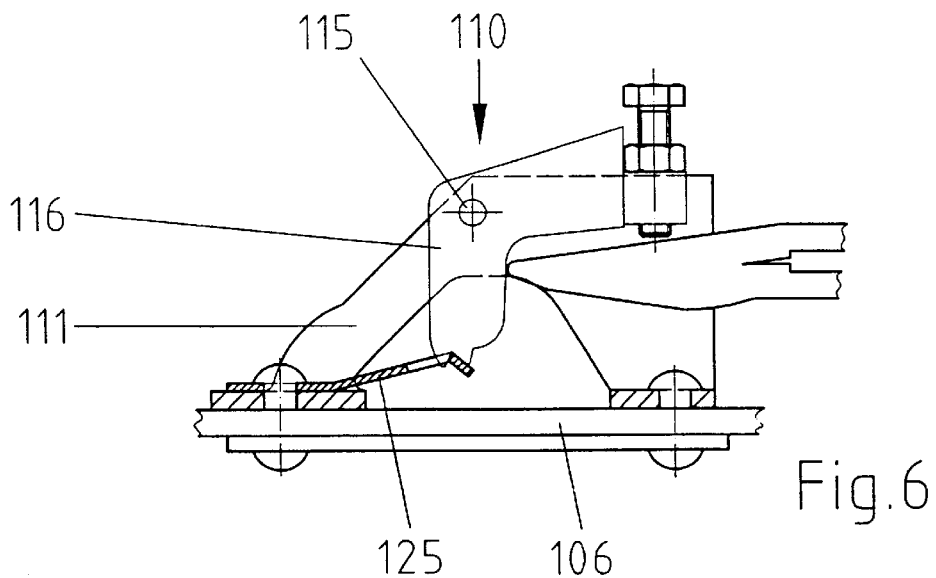
FIG. 6 is a longitudinal sectional view through a changed embodiment of the attachment element in reference to the arrangement of the retaining element formed as a leaf spring.
Figure 7:
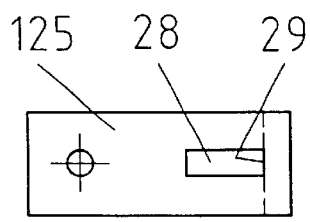
FIG. 7 is an elevation view of a leaf spring with a through hole and fitting to the embodiment according FIG. 6.

An additional embodiment according to FIGS. 6 and 7 will be described. Important components, which correspond to the embodiment according to FIGS. 1 to 5, are characterised by reference numerals, which are increased by the number 100 compared to the components according to the embodiment of FIGS. 1 to 5.

The structure of the attachment element 110, retaining lever 116, holding element 111, pivot pin 115 as well as the support bar 106 correspond to the embodiment according to FIGS. 1 to 5. Deviating from the above named embodiment the attachment element 110 has a leaf spring 125 as a retaining element is illustrated in FIG. 7. The arrangement to the holding element 111 also deviate from FIGS. 1 to 5. The leaf spring 125 is attached at its end facing away from the reaping finger 2 in the holding element 111 by a rivet or screw. The rivet or screw retains the holding element 111 on the support bar 106. The leaf spring 125 has a through hole 28 which has a contact face 29. The contact face 29 contacts one of the corresponding retaining faces 124, 124a of the retaining lever 116. Thus, in the retained condition, when supported on the reaping finger 2, a torque in the left turning sense and a tensioning force in the leaf spring 125 is produced. Accordingly, no buckling of the leaf spring 125 is produced, even when high forces act on the retaining lever 116.

While the above detailed description describes the preferred embodiment of the present invention, the invention is susceptible to modification, variation and alteration without deviating from the scope and fair meaning of the subjoined claims.

What is claimed is:

1. A crop lifter for harvesting machines reaping systems, with reaping fingers attached on a bed plate, comprising:
    a support bar connectable to the bed plate;
    a grain lifter connected to the support bar;
    an attachment element connected to the support bar and retainable on the reaping finger;
    a holding element attached on the support bar,
    a retaining lever pivotably supported around a pivot pin on the holding element, said retaining lever having a first lever arm with an adjusting screw supportable on the reaping finger for adjusting height of the reaping finger, and having a second lever arm with at least one retaining face; and
    a retaining element for contacting a retaining face of the retaining lever for retaining the retaining lever against displacement.

2. The crop lifter according to claim 1, wherein the first lever arm has a threaded bore, the adjusting screw passes through said threaded bore.

3. The crop lifter according to claim 1, wherein a lock nut is arranged on the adjusting screw.

4. The crop lifter according to claim 1, wherein the retaining face is part of a retaining tooth.

5. The crop lifter according to claim 1, wherein the retaining element is formed by a leaf spring elastically contacting the retaining face of the retaining lever.

6. The crop lifter according to claim 5, wherein a front face of the leaf spring abuts the retaining face.

7. The crop lifter according to claim 5, wherein the leaf spring has a through hole having a contact face and the retaining lever contacts with its retaining face the contact face.

8. The crop lifter according to claim 1, wherein the first and the second lever arm abut each other at an angle with the pivot axis of the pivot pin arranged in the abutment area of the same.

9. The crop lifter according to claim 1, wherein the holding element has two distanced legs connected at least by one web with the web connected to the support bar.

10. The crop lifter according to claim 9, wherein the retaining element is arranged between the two legs and in the movement area of the second lever arm.

11. A crop lifter for harvesting machines reaping systems, with reaping fingers attached on a bed plate, comprising:
    a support bar connectable to the bed plate;
    a grain lifter connected to the support bar;
    an attachment element connected to the support bar and retainable on the reaping finger;
    a holding element attached on the support bar,
    a retaining lever pivotably supported around a pivot pin on the holding element, said retaining lever having a first lever arm with an adjusting screw supportable on the reaping finger, and having a second lever arm with at least one retaining face; and
    a retaining element for contacting a retaining face of the retaining lever for retaining the retaining lever against displacement, and the first and the second lever arm abut each other at an angle with the pivot axis of the pivot pin arranged in the abutment area of the same.

* * * * *